(12) United States Patent
Reed et al.

(10) Patent No.: US 6,275,707 B1
(45) Date of Patent: Aug. 14, 2001

(54) METHOD AND APPARATUS FOR ASSIGNING LOCATION ESTIMATES FROM A FIRST TRANSCEIVER TO A SECOND TRANSCEIVER

(75) Inventors: John Douglas Reed, Arlington; Jack Anthony Smith, Bedford, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/415,591

(22) Filed: Oct. 8, 1999

(51) Int. Cl.[7] .................................................. H04Q 7/20
(52) U.S. Cl. ........................ 455/456; 455/457; 455/525; 342/457; 342/357.1
(58) Field of Search ................................ 455/456, 457, 455/517, 525; 342/457, 357.1, 357.16, 357.08

(56) References Cited

U.S. PATENT DOCUMENTS

| | | | |
|---|---|---|---|
| 5,508,708 | * | 4/1996 | Ghosh et al. ...................... 342/457 |
| 5,724,660 | * | 3/1998 | Kauser et al. ..................... 455/456 |
| 5,764,188 | * | 6/1998 | Ghosh et al. ...................... 342/457 |
| 5,844,522 | * | 12/1998 | Sheffer et al. ..................... 342/457 |
| 5,974,329 | * | 11/1999 | Wylie et al. ....................... 455/456 |
| 6,021,330 | * | 2/2000 | Vannucci ........................... 455/456 |
| 6,026,305 | * | 2/2000 | Salinger et al. ................... 455/422 |
| 6,061,561 | * | 5/2000 | Alanara et al. ................... 455/422 |
| 6,128,501 | * | 10/2000 | Ffoulkes-Jones ................. 455/456 |

* cited by examiner

*Primary Examiner*—William G. Trost
*Assistant Examiner*—Marceau Milord
(74) *Attorney, Agent, or Firm*—L. Bruce Terry

(57) ABSTRACT

A method and apparatus for assigning location estimates from a first transceiver of a plurality of wireless transceivers to a second transceiver is disclosed. The present invention makes use of a low power short-range auxiliary communication link incorporated within networked devices to interact with nearby devices for obtaining location estimates of the current location of a device. Confidence levels are then assigned to the information obtained from the interactions with the nearby devices, and a determination of whether to update the location estimate is made.

21 Claims, 3 Drawing Sheets

METHOD AND APPARATUS FOR ASSIGNING LOCATION ESTIMATES FROM A FIRST TRANSCEIVER TO A SECOND TRANSCEIVER

FIELD OF THE INVENTION

This invention relates in general to wireless communication systems, and more particularly, to a method and apparatus for assigning location estimates from a first transceiver of a plurality of wireless transceivers to a second transceiver.

BACKGROUND OF THE INVENTION

Wireless communication systems for serving the connectivity needs of portable transceivers are rapidly evolving into linked, multi-speed wireless networks. For example, a wireless wide area network (WAN) may provide relatively low speed connectivity throughout a metropolitan area, while numerous wireless short range networks (SRNs) also may exist throughout the area for providing short range high speed connectivity where needed. Portable transceivers that are capable of peer-to-peer communications, e.g., Bluetooth devices, also can create ad hoc SRNs with one another that can operate independently of fixed portions of the wireless communications system. These ad hoc SRNs may also include connections to devices in wired networks.

Sometimes, a controller in a wireless or wired network may determine a need for information that is available from a device that is connected to the network, or from another transceiver within the same network or ad hoc network as the first transceiver. The information may be of many different types, and a good example is server-assisted differentially corrected global positioning system (GPS) information, which can greatly enhance the sensitivity and accuracy of a GPS receiver that may be used by the portable transceiver for location determination. Typically, the network server has been centrally located, e.g., at the site of a central controller of the wireless communications system, and has been accessed through the wireless WAN. Accessing the network server for assisted location information can generate a moderate amount of additional traffic in the wireless WAN when a large number of the portable transceivers are GPS equipped. Although this traffic is undesirable, it is a relative low overhead compared to the total traffic supported by the WAN.

In addition, many portable transceivers, or fixed wired network devices which have wireless SRN capabilities, will not have location finding capability, yet could benefit from location information either locally, or within a network. Thus, what is needed is a method and apparatus for assigning location estimates from a first transceiver of a plurality of transceivers to a second transceiver to provide estimates to devices that do not have location determination capabilities. Preferably, the method and apparatus will operate to reduce the wireless WAN traffic required to seek and transfer the information, thereby allowing the WAN to operate efficiently without undue system overhead.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
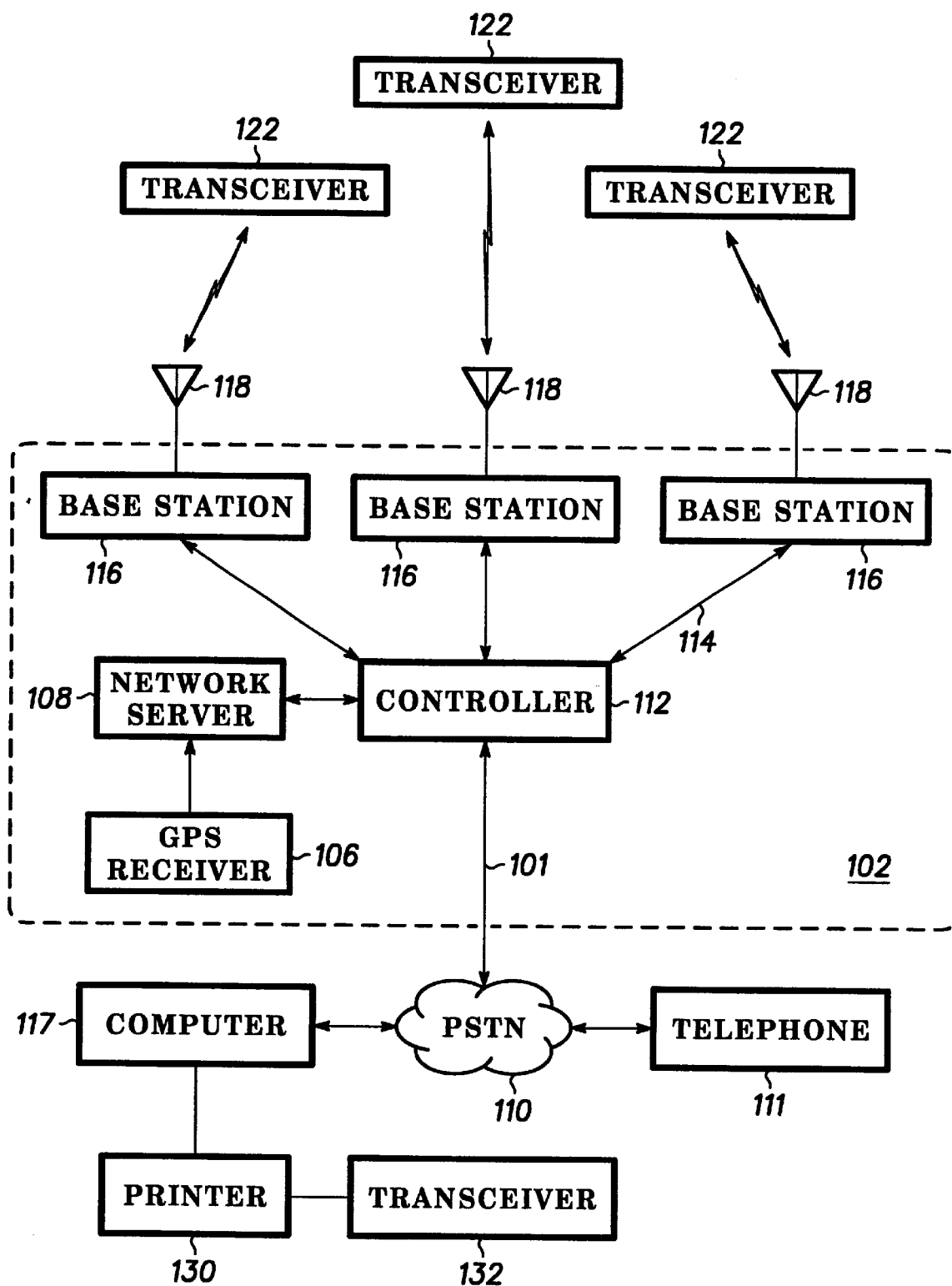
FIG. 1 is an electrical block diagram of an exemplary wireless communication system in accordance with the present invention.

Referring to FIG. 1, an electrical block diagram depicts an exemplary wireless communication system in accordance with the present invention, comprising a fixed portion 102 including a controller 112 and a plurality of conventional base stations 116, the communication system also including a plurality of transceivers 122. The base stations 116 preferably communicate with the transceivers 122 utilizing conventional radio frequency (RF) techniques, and are coupled by conventional communication links 114 to the controller 112, which controls the base stations 116.

Each of the base stations 116 transmits RF signals to the transceivers 122 via an antenna 118. The base stations 116 preferably each receive RF signals from the plurality of transceivers 122 via the antenna 118. It will be appreciated by those skilled in the art that, alternatively, another wireless communication technology, such as infra red technology, can be used to comminute between the base stations 116 and the transceiver 122.

The controller 112 is preferably coupled by telephone links 101 to a public switched telephone network (PSTN) 110 for receiving selected call message originations therefrom. Selective call originations comprising voice or data messages from the PSTN can be generated, for example, from a conventional telephone 111 or a conventional computer 117 coupled to PSTN 110. A printer 130 is coupled to computer 117, and in addition contains a low power transceiver 132 capable of transferring data within SRNs, e.g. a Bluetooth transceiver. It will be appreciated that, alternatively, other types of networks, e.g., a local area network (LAN), a wide area network (WAN), and the internet, to name a few, can be used for receiving selective call originations. The controller 112 is also coupled to a conventional network server 108 for providing information requested by the transceivers 122. The network server 108 is preferably coupled to a GPS receiver 106 for cooperating with the network server 108 to provide server assisted differential GPS information to the transceivers 122.

It will be appreciated by those skilled in the art that for peer-to-peer and short-range communications, many technologies and protocols, such as Bluetooth, Piano, IRDA, Home RF, and IEEE Standard 802.11, may be utilized. It will further be appreciated by those skilled in the art that the present invention is applicable to many different types of wireless communications systems, including cellular telephone systems, trunked dispatch systems, and voice and data messaging systems, to name a few.

Figure 2:
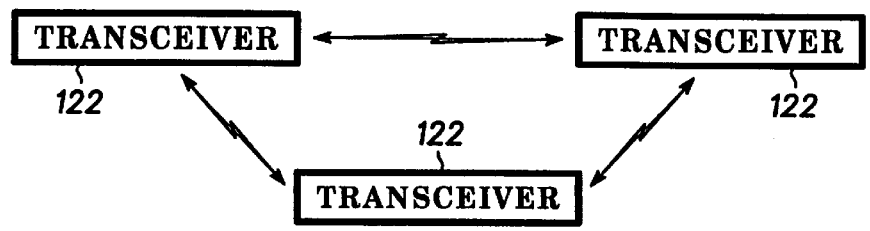
FIG. 2 is an electrical block diagram of an exemplary peer-to-peer mode of operation of the transceivers in accordance with the present invention.

FIG. 2 illustrates an electrical block diagram of an exemplary peer-to-peer mode of operation of the transceivers 122 in accordance with the present invention. In this mode, the transceivers 122 form an ad hoc short-range network among themselves based upon the interactions of low power wireless transceivers, e.g. Bluetooth, Home RF, IEEE Standard 802.11, or other similar devices.

Figure 3:
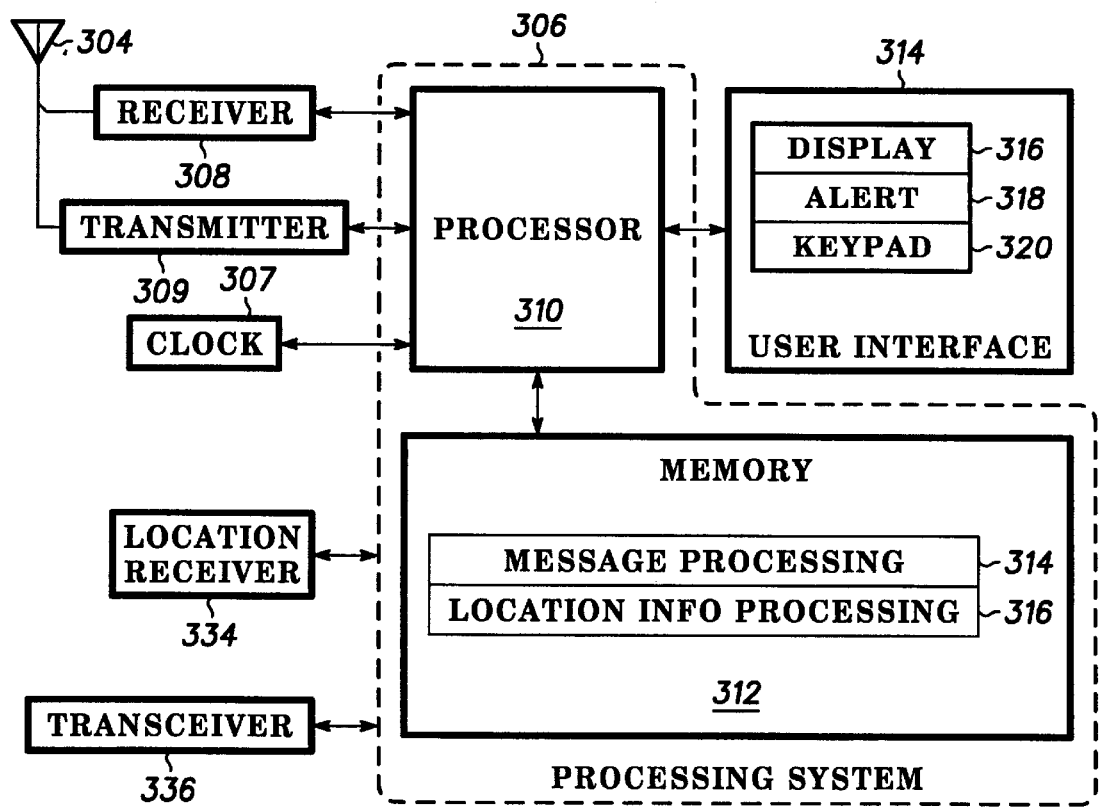
FIG. 3 is an electrical block diagram of an exemplary transceiver in accordance with the present invention.

FIG. 3 is an electrical block diagram of an exemplary transceiver 122 in accordance with the present invention. The transceiver 122 comprises an antenna 304 for receiving an incoming call or message and for transmitting an outgoing call or message. The antenna 304 is preferably coupled to a conventional receiver 308 for receiving the incoming call or message and is coupled to a conventional transmitter 309 for transmitting the outgoing call or message. The receiver 308 and transmitter 309 are coupled to a processing system 306 for processing the incoming and outgoing call or messages and for controlling the transceiver 122 in accordance with the present invention. A user interface 314 may also be coupled to the processing system 306 for interfacing with a user. The user interface 314 may comprise a conventional telephone keypad 320 or a conventional keyboard for requesting that an operation be performed and for controlling the transceiving 122, a conventional display 316, and a conventional alert element 318 for alerting the user when an incoming call or message arrives. A conventional clock 307 is also coupled to the processing system 306 for supporting time keeping requirements of the transceiver 122.

The processing system 306 comprises a conventional processor 310 and a conventional memory 312. The memory 312 comprises software elements and data for programming the processing system 306 in accordance with the present invention. In the preferred embodiment, the memory 312 further comprises a message processing element 314 for programming the processing system 306 to process messages through well-known techniques. In addition, the memory 312 includes a location information processing program 316 for programming the processing system 306 to cooperate with the controller 312 to process location information through well known techniques, such as server assisted differentially corrected GPS techniques. In that embodiment, the transceiver 122 also includes a location receiver 334, such as a GPS receiver, coupled to the processing system 306. An auxiliary transceiver 336, e.g. a Bluetooth transceiver, is connected to processing system 306 to facilitate connection to SRNs using ad hoc networking techniques.

Figure 4:
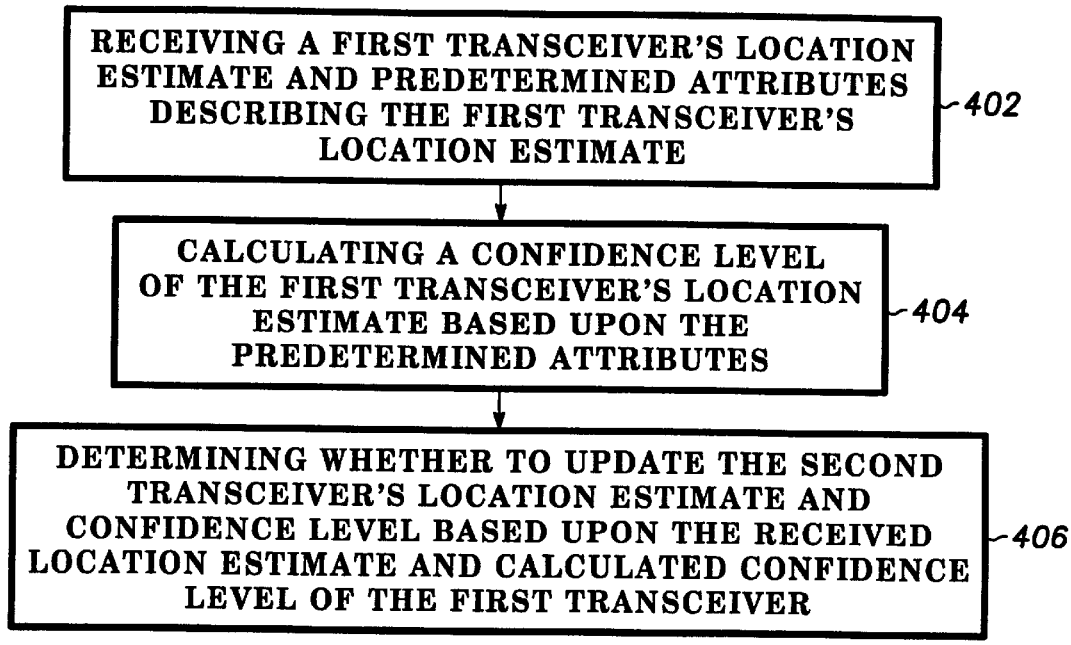
FIG. 4 is a flow diagram depicting the operation of the transceiver in accordance with the present invention.

FIG. 4 is a flow diagram depicting the operation of a transceiver in accordance with the present invention. The flow begins at reference numeral 402 wherein the step of receiving a first transceiver's location estimate and predetermined attributes of the first transceiver's location estimate is performed. Thereafter, at reference numeral 404, the step of calculating a confidence level of the first transceiver's location estimate based upon the predetermined attributes is performed. Finally, at reference numeral 406, the step of determining whether to update a second transceiver's location estimate and confidence level based upon the received location estimate and calculated confidence level of the first transceiver is performed. In the preferred embodiment, the device collecting the location estimate and attributes (the second transceiver in this example) will calculate the confidence level of the estimate. In an alternate embodiment, a device other than the device collecting the location estimate and confidence level will calculate the confidence level of the estimate, and thereafter transfer a calibrated value representing the confidence level of the location estimate to another device.

Figure 5:
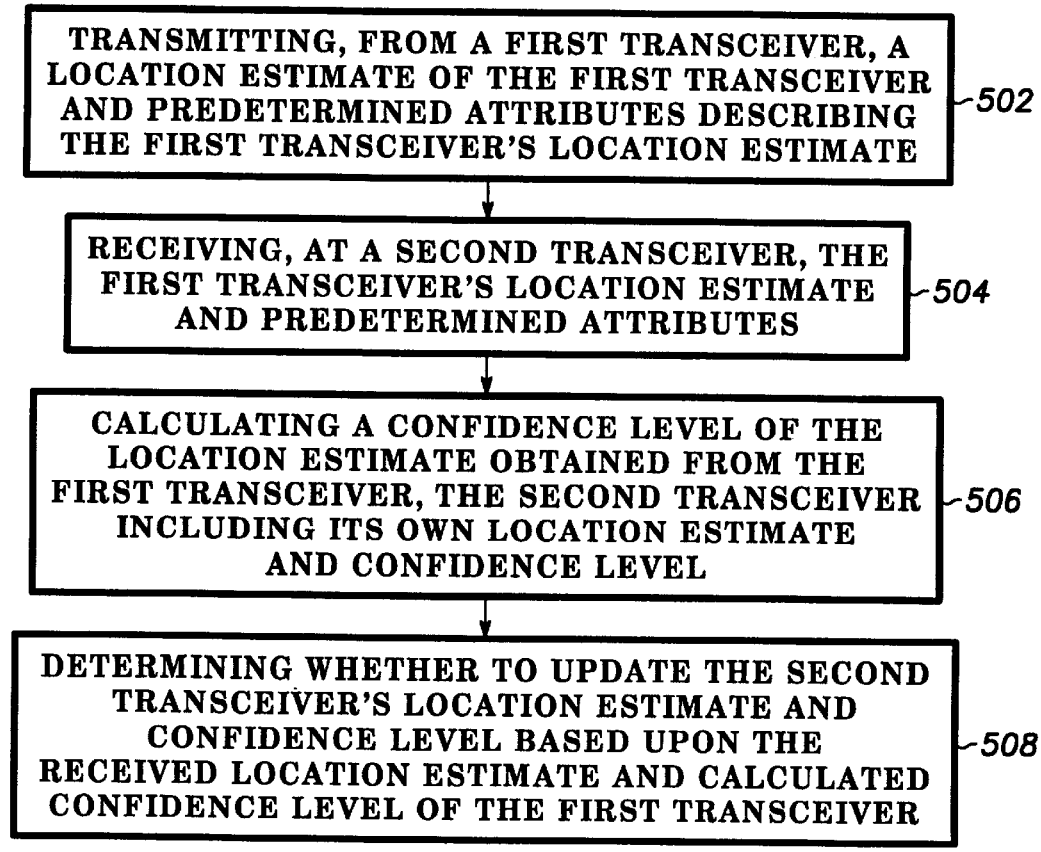
FIG. 5 is a flow diagram depicting the process of transferring a location estimate from a first transceiver of a plurality of wireless transceivers to a second transceiver according to the method and system of the present invention.

FIG. 5 is a flow diagram depicting the process of transferring a location estimate from a first transceiver of a plurality of wireless transceivers to a second transceiver according to the method and system of the present invention. The flow begins at reference numeral 502, wherein the step of transmitting, from a first transceiver, a location estimate of the first transceiver and predetermined attributes of the first transceiver's location estimate is performed. Next, at reference numeral 504, the step of receiving, at a second transceiver, the first transceiver's location estimate and predetermined attributes is performed. Thereafter, at step 506, the step of calculating a confidence level of the location estimate obtained from the first transceiver based on the associated attributes is performed. Finally, at reference numeral 508, the step of determining whether to update the second transceiver's location estimate and confidence level based upon the received location estimate and calculated confidence level of the first transceiver is performed. The device calculating the confidence level may be as described above with reference to FIG. 4.

As described above, the present invention comprises a method and apparatus to obtain location estimates for a device by interacting with nearby devices. The nearby devices may use any number of means to make the location estimate. Confidence levels are then assigned to the information obtained from the interactions with the nearby devices. A number of parameters may be used to establish a confidence level of the location estimate received from a nearby device, such that a confidence level may be determined from the following equation:

$$CL(d_i) = r_i * c_i * [CL(d_{i-1})] e^{-b_i SE_i t_i} + q_i$$

where:

i = generation of the location estimate for current device $d_0$ = device possessing or making the original location estimate $d_{i-1}$ = device which is contributing a location estimate $d_i$ = device which is accepting a location estimate $r_i$, $b_i$, and $q_i$ = scale factors to account for equipment variations $CL(d_i)$ = the calculated confidence level of the new location estimate, based on the associated location attributes, obtained from interaction with a nearby device, or an original estimate.

$c_i$ = the attenuation in confidence level from being a second party to the estimate. Each generation of donor to recipient will see this attenuation in confidence level.

$SE_i$ = the speed estimate of the device contributing the location estimate and calculating a confidence level. For example, SE=0 for fixed devices, and increases in proportion to speed.

$t_i$ = elapsed time in seconds since the location estimate was made.

As such, the confidence level assigned to the information obtained from the interactions with the nearby devices may be a function of the confidence level of the donated location estimate, time since the estimate was made, motion of the receiving unit, the method used to obtain the location estimate, the number of times the information may have been repeated from one device to another, the signal strength and quality of the communication signal, etc. Methods used to make an initial location estimate may vary, including the use of GPS receivers, differentially corrected GPS receivers, obtaining a location from a nearby device which has a preprogranmed location, normally referred to as a "signpost," and methods may include location estimates generated from cellular systems using other techniques.

Each of these types of location estimates are examples of some of the information attributes that may be sent with the location estimate from one device to another, and used in calculating a confidence level. In addition, fixed devices, such as desktop computers, printers, etc. may store a weighted average location estimate of those estimates with the highest confidence levels to improve the base line location estimate for these devices.

When a device receives a first location estimate and calculates a confidence level in that estimate, the location estimate, the associated attributes and the calculated confidence level are stored locally in the device. When a second location estimate is received, a second confidence level is calculated from the associated attributes. The two location estimates are then compared based on the calculated confidence levels to determine the preferred location estimate. For example, if the device receives:

L1=location estimate 1

A1 attributes of location estimate 1 and then calculates:

CL1 confidence level of location estimate 1 and retrieves stored quantities:

L2=location estimate 2

A2=attributes of location estimate 2 and calculates:

CL2=confidence level of location estimate 2

To further illustrate, assume that:

L1=32 deg 50 min 43 sec N latitude, 97 deg 17 min 35 sec W longitude and CL1=0.01

L2=32 deg 50 min 45 sec N latitude, 97 deg 17 min 37 sec W longitude and CL2=0.97

The comparison of the two confidence levels would indicate that C2 has a much higher confidence level and therefore L2 would be selected as the preferred location estimate for the device based on these two samples. It is contemplated that with numerous samples being collected and stored, more complex processing of the preferred location estimate can be provided if desired. This could include a weighted average of the location estimates based on the confidence level of the estimates, with samples having poor confidence levels removed from the processing if sufficient samples were present.

It will be appreciated by those skilled in the art that selected ones of the transceivers can be positioned at fixed locations. As described above, an example is a transceiver serving as a wireless interface for a printer, facsimile machine, computer, etc. Such a fixed transceiver preferably is pre-programmed with location information describing the location at which the transceiver is placed. It will be further appreciated that, in response to having location information that is likely to be of interest to other transceivers, a transceiver can advertise the availability of the location information, e.g., through periodic transmissions of messages.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for transferring a location estimate from a first transceiver of a plurality of wireless transceivers to a second transceiver, the method comprising the steps of:

transmitting, from a first transceiver, a location estimate of the first transceiver and predetermined attributes of the location estimate of the first transceiver;

calculating a first confidence level of the location estimate of the first transceiver based upon the predetermined attributes;

receiving, at a second transceiver, the location estimate of the first transceiver and the first confidence level, the second transceiver having a location estimate of the second transceiver and corresponding second confidence level; and determining whether to update the location estimate of the second transceiver and corresponding second confidence level based upon the location estimate and first confidence level of the first transceiver.

2. A method as recited in claim 1, including a step of adjusting a confidence level of a location estimate of a transceiver based upon one of the lapsed time since receiving an updated location estimate;

an estimate of motion of another transceiver; and the proximity of the first transceiver to the second transceiver.

3. A method as recited in claim 1, including the step of attenuating a confidence level with each generation of exchanging location estimates, thereby reducing the impact of second and third hand information.

4. A method as recited in claim 1, including the step of storing and averaging location estimates from those transceivers of the plurality of transceivers with the highest confidence levels to improve a base line location estimate for those transceivers.

5. A method as recited in claim 1, including the step of utilizing a third transceiver to communicate the location estimate of the first transceiver and first confidence level to the second transceiver.

6. A method as recited in claim 1, further comprising the step of preprogramming fixed ones of the plurality of wireless transceivers with location information corresponding to a location at which each is placed.

7. A method for transferring a location estimate from a first transceiver of a plurality of wireless transceivers to a second transceiver, the method comprising the steps of:

at a second transceiver having location estimate of the second transceiver and a corresponding second confidence level:

receiving a first transceiver's location estimate and predetermined attributes of the first transceiver's location estimate;

receiving a calculated confidence level of the first transceiver's location estimate based upon the predetermined attributes; and determining whether to update the location estimate of the second transceiver and the corresponding second confidence level based upon the first transceiver's location estimate and calculated confidence level of the first transceiver.

8. A method as recited in claim 7, including a step of adjusting a confidence level of a location estimate of a transceiver based upon one of:

the lapsed time since receiving an updated location estimate;

an estimate of motion of another transceiver; and the proximity of the first transceiver to the second transceiver.

9. A method as recited in claim 8, including the step of utilizing a third transceiver to communicate the first transceiver's location estimate and confidence level to the second transceiver.

10. A method as recited in claim 8, including the step of adjusting a confidence level of a location estimate based upon one of the lapsed time since receiving an updated location estimate;

an estimate of motion of a transceiver; and the proximity of the first transceiver to the second transceiver.

11. A method as recited in claim 7, including the step of storing and averaging location estimates from those transceivers of the plurality of transceivers with the highest confidence levels to improve a base line location estimate for those transceivers.

12. A method as recited in claim 7, including the step of utilizing a third transceiver to communicate the first transceiver's location estimate and the first confidence level to the second transceiver.

13. An apparatus for transferring a location estimate from a first transceiver of a plurality of transceivers to a second transceiver, the second transceiver having a location estimate of the second transciever and a corresponding second confidence level, the apparatus comprising:

a receiver adapted to receive a location estimate;

a transmitter adapted to transmit the location estimate; and a processing system coupled to the receiver and coupled to the transmitter, the processing system programmed to:

receive a first transceiver's location estimate and predetermined attributes of the first transceiver's location estimate;

calculate a calculated confidence level of the first transceiver's location estimate based upon the predetermined attributes; and determine whether to update the location estimate of the second transceiver and the corresponding second confidence level based upon the first transceiver's location estimate and calculated confidence level of the first transceiver.

14. An apparatus as recited in claim 13, wherein the processing system is further programmed to adjust a confidence level of a location estimate of a transceiver based upon one of:

the lapsed time since receiving an updated location estimate;

an estimate of motion of another transceiver; and the proximity of the first transceiver to the second transceiver.

15. An apparatus for assigning a location estimate from a first transceiver of a plurality of transceivers to a second transceiver, the second transceiver having its own location estimate and confidence level, the apparatus comprising:

a receiver adapted to receive the location estimate;

a transmitter adapted to transmit the location estimate; and a processing system coupled to the receiver and coupled to the transmitter, the processing system programmed to:

receive the first transceiver's location estimate and predetermined attributes describing the first transceiver's location estimate;

calculate a confidence level of the first transceiver's location estimate based upon the predetermined attributes; and determine whether to update the second transceiver's location estimate and confidence level based upon the received location estimate and calculated confidence level of the first transceiver.

16. An apparatus as recited in claim 13, wherein the processing system is further programmed to store and average location estimates from those transceivers of the plurality of transceivers with the highest confidence levels to improve a base line location estimate for those transceivers.

17. An apparatus as recited in claim 13, wherein the processing system is further programmed to utilize a third transceiver to communicate the first transceiver's location estimate and predetermined attributes to the processing system.

18. An apparatus as recited in claim 15, wherein the processing system is further programmed to store and averaging the location estimates from those transceivers with the highest confidence levels to improve the base line location estimate for the transceiver receiving the location estimate.

19. An apparatus as recited in claim 15, wherein the processing system is further programmed to utilize a third transceiver to communicate the first transceiver's location estimate and confidence level to the second transceiver.

20. An apparatus as recited in claim 15, wherein the processing system is further programmed to detect a need for a location estimate.

21. An apparatus as recited in claim 15, wherein the processing system is further preprogrammed with location information corresponding to a location at which each one of fixed ones of the plurality of wireless transceivers is placed.

* * * * *